United States Patent [19]

Sides et al.

[11] 4,286,828

[45] Sep. 1, 1981

[54] OFFSET-PAD BEARING

[75] Inventors: Nathan T. Sides, Annapolis; Thomas L. Daugherty, Arnold, both of Md.

[73] Assignee: The United States of America as represented by the Secretary of the Navy, Washington, D.C.

[21] Appl. No.: 98,276

[22] Filed: Nov. 28, 1979

[51] Int. Cl.³ .......................................... F16C 27/02
[52] U.S. Cl. ...................................... 308/26; 308/9; 308/160
[58] Field of Search ................ 308/160, 9, 2 R, 168, 308/170, 163, 26

[56] References Cited

U.S. PATENT DOCUMENTS

| 2,424,028 | 7/1947 | Haeberlein | 308/160 |
| 3,829,180 | 8/1974 | Gardner | 308/160 |
| 3,930,691 | 1/1976 | Greene | 308/160 |
| 3,944,304 | 3/1976 | Purtschert | 308/9 |

Primary Examiner—Lenard A. Footland
Attorney, Agent, or Firm—Richard S. Sciascia; William T. Ellis; Kenneth E. Walden

[57] ABSTRACT

A bearing pad for slidably supporting a relatively movable load applying member. The pad comprises a face member swingably mounted on a base member and having a bearing surface laterally offset toward the leading edge from the nadir of the base member and facing the movable member whereby the load normal to the bearing surface and frictional drag across the bearing surface both act to cause the face member to swing arcuately in the direction of movement of the moving member thereby tilting the bearing surface for trapping a wedged shaped film of lubricant between the bearing surface and the movable member.

1 Claim, 4 Drawing Figures

OFFSET-PAD BEARING

BACKGROUND OF THE INVENTION

This invention relates to an improved bearing pad used in conjunction with a plurality of similar pads disposed about a rotatable shaft or shaft collar in load supporting relationship. Each pad is constructed in a manner whereby a bearing surface in sliding contact with a movable load tilts for trapping a wedge-shaped film of lubricant therebetween.

There has been developed in the prior art numerous arrangements for causing bearing surfaces of pad-type bearings to tilt in relationship to a moving load for trapping a wedge shaped film of lubricant therebetween.

Examples, but by no means a complete survey of patents illustrating such arrangements are referenced in the following identified patents. U.S. Pat. No. 1,684,693 discloses a thrust bearing having a plurality of annularly spaced segments with supports which tilt to one side upon the application of load for trapping a wedge of lubricant. U.S. Pat. No. 2,424,028 discloses a bearing assembly made up of a plurality of pads each of which have offset webs whereby the pad is caused to tilt under film loading across its face to the position illustrated. U.S. Pat. No. 3,398,996; 3,398,997 and British Specification No. 1,075,140 each illustrate pivoted shoe bearings including mechanism for causing the shoe to assume an inclined position relative to a moving load for forming a lubricant receiving gap. U.S. Pat. No. 3,390,691 defines a novel pad construction adapted to tilt in response to load and frictional drag across its face. U.S. Pat. No. 3,944,304 relates to gas lubricated bearing segments with asymmetrical bearing surfaces of concave convex shape disposed in recesses for pivoting therein about an axis. During operation a part of the gas lubricating film between the shaft and bearings segment flows into a gap between the housing and bearing segment to float the bearing segment.

SUMMARY OF THE INVENTION

The bearing embodying the present invention is of the pad type having a face member with a bearing surface facing a moving load in sliding contact therewith. The face is adapted to tilt in response to load and frictional drag for producing a wedge shaped space for collecting a wedge-shaped film of lubricant between relatively sliding surfaces. The individual pads include a relatively stationary base member to which the face member is swingably secured. The face member has an offset bearing surface facing a movable load applying member in sliding engagement therewith. The face member, while connected to the base member, is permitted to swing relative to the base member on a radius having an axis located on the other side of the bearing surface. The connection between the base and face members comprising a bonded metal-elastomer laminated structure arcuately curved about the axis substantially as disclosed in U.S. Pat. No. 3,930,691. The bearing surface is located on a portion of the face member opposite the laminated connection for facing a movable load applying member. This bearing surface is laterally offset in a particular direction from a plane which contains the axis of swing and which is generally normal to the direction of movement of the moving load whereby load normal to the bearing surface causes the face to swing thereby tilting the bearing surface at a slight angle between the surface of the moving load applying member and the face member to produce a wedge shaped space for collecting a wedge-shaped film of lubricant therebetween.

OBJECTS OF THE INVENTION

It is therefore an object of this invention to produce a bearing pad having a high load capacity.

Another object of this invention is to produce a bearing pad having an offset bearing surface which tilts in response to load thereon for producing a wedge-shaped film of lubricant between the tilted bearing surface and the surface of the relatively moving load.

Other objects of this invention will become more apparent when considered in conjunction with the specification, claims, and accompanying drawings.

DESCRIPTION OF THE PREFERRED EMBODIMENT

This invention relates to bearing pads and is an improvement on the invention disclosed in U.S. Pat. No. 3,930,691, which in operation under high load versus frictional drag exhibits an undesirable characteristic to be more fully disclosed hereinafter.

Figure 1A:
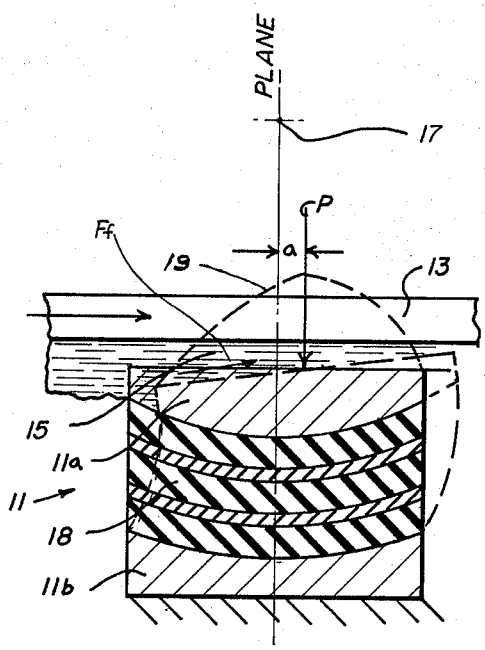
FIG. 1a is essentially a reproduction of FIG. 3 from U.S. Pat. No. 3,930,691 but showing the pad bearing in reverse image for easy comparison with other figures of the drawing.
Figure 1B:
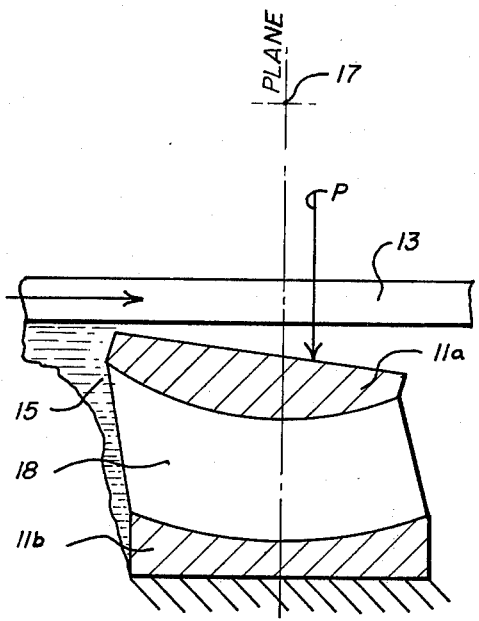
FIG. 1b illustrates a deficiency of the pad bearing according to FIG. 1a when operating under heavy load.
Figure 3:
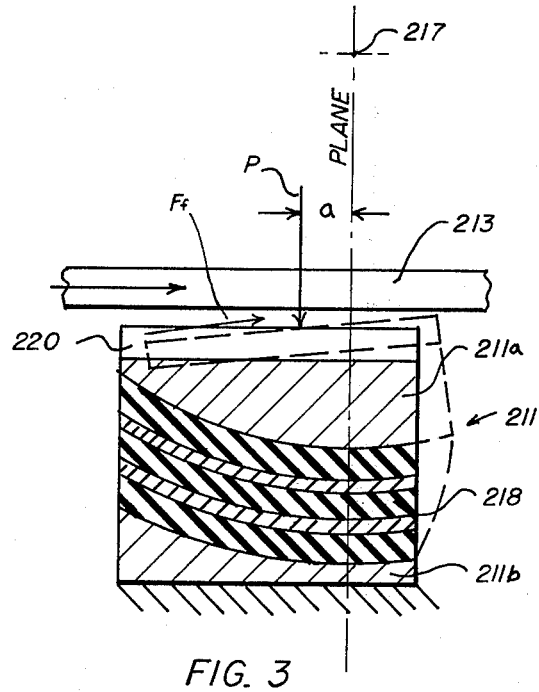
FIG. 3 is a cross-sectional view of bearing pad according to another embodiment of the present invention.

Referring now to the drawings, there is shown in FIG. 1a a sectional view of a bearing pad, essentially a reproduction of FIG. 3 from U.S. Pat. No. 3,930,691, but in reverse image. In FIG. 1a, and in each of the other figures, the load applying movable member is showing moving to the right across the bearing pad. FIG. 1a shows a cross-section of a preferred embodiment of the bearing pad described in U.S. Pat. No. 3,930,691 in which a face 11a of a bearing pad 11 is bonded to arcuately shaped metal-elastomer laminates 18 which in turn is bonded to base 11b. A plurality of these bearing pads spaced peripherally about a shaft collar define a thrust bearing assembly. As illustrated in FIG. 1a, the metal-elastomer laminate secures the face and base members of each pad. The laminate is relatively incompressible and will not substantially deform in compression in response to load force applied normal to the faces thereof. The laminate will, however, self-adjust in shear displacement in either direction of movement of member 13 in response to a moment about the center of swing 17, 17 or 217. In the FIG. 1a arrangement of bearing pad 11, parts 11a and 11b meet in an arcuate interface on opposite side of laminate 18. The center of arc of the interface and laminate is on a line extending from the axis of swing or center of curvature 17 in the direction of member 13. For future reference, axis 17 is herein identified as lying in a plane generally normal to the direction of motion of movable member 13 and bisecting pad 11. The arcuate interface may be cylindrical or spherical, depending on the application of the bearing. Following the explanation in U.S. Pat. No. 3,930,691, as load bearing member 13 moves to the right, it exerts both normal load and frictional drag forces on the bearing surface of face 11a. These forces tend to swing face 11a in opposite directions. As member 13 moves to the right (FIG. 1a) across the upper or bearing surface of face 11a, the frictional drag $F_f$ therebetween swings face 11a about axis 17 toward the right to the dotted line position (exaggerated). This swinging motion tilts the bearing surface at a slight angle relative to the underneath bearing surface of member 13. This angular displacement encourages the production and retention of a wedge-shaped film of lubricant between the pad face and movable member 13 for supporting the movable member. Pressure on the wedge of lubricant increases generally from adjacent the leading edge of the bearing surface according to profile 19 and diminishing toward the trailing edge. All the load force may be considered as concentrated at the center of pressure P. Therefore, there is a counter force tending to swing face 11a to the left in opposition of the aforementioned frictional drag. The tilt of the bearing surface and wedge of load supporting lubricant as illustrated in FIG. 1a exists only as long as the movement of the frictional drag $F_f$ tending to swing face 11a to the right is greater than the movement produced by the pressure at P acting about moment arm "a" tending to swing face 11a to the left. By this arrangement there is established a balanced condition with face 11a tilted as shown in FIG. 1a. However, when load at P is increased to an extent such that there is a net resultant force which tilts face 11a to the left as illustrated in FIG. 1b, the theory of FIG. 1a is no longer effective, and lubricant 15' is wiped away by the leading edge of face 11a. Therefore, insufficient lubricant is maintained between the bearing surface of face 11a and movable load applying member 13.

The invention of U.S. Pat. No. 3,930,691 is effective only as long as the load on the bearing face is not so great as to cause the bearing face to swing away from the position shown in FIG. 1a toward the position shown in FIG. 1b where lubricant is wiped away by the leading edge of the face. It is to this shortcoming that the present invention is directed.

Figure 2:
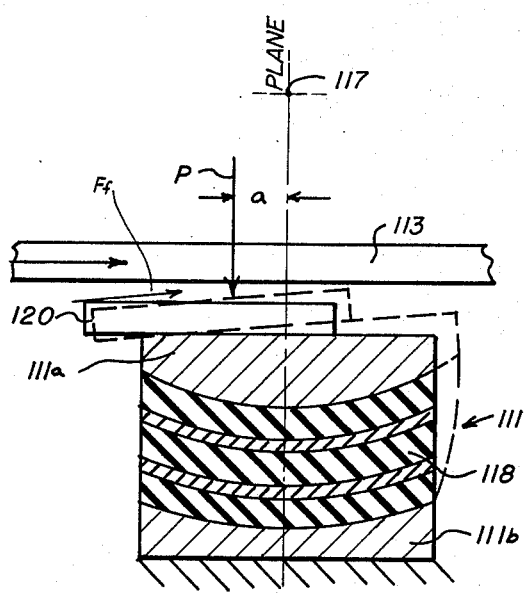
FIG. 2 is a cross-sectional view of a bearing pad according to the present invention.

The present invention overcomes the problem identified above by providing a construction whereby load at P, which acts normal to the bearing surface, and frictional drag $F_f$, which acts laterally across the bearing surface, both tend to tilt the bearing surface to the desired position regardless of the relative magnitude of load at P versus frictional drag. By referring to FIG. 2, showing one form of the invention, there is illustrated the principal of the invention with reference to some parts substantially identical to those disclosed in FIG. 1a. Bearing pad 111 is comprised of base member 111b and face member 111a which are secured together such as by bonding to opposite sides of a metal-elastomer laminate assembly 118. The facing surface of these members and the laminate are formed to a curvature defined by a radius having a center or axis 117 disposed on the other side of the bearing surface plane of contact with movable member 113. Plate member 120, secured to the top of face member 111a, defines a bearing surface facing movable member 113 for slidably carrying the load applied thereby y. This bearing surface may be of a separate piece as shown in FIG. 2 or integrally formed on the face member (not illustrated). In either arrangement the bearing surface is laterally offset from a plane which contains axis 117 and which is generally normal to the direction of movement of movable member 113, as illustrated in FIG. 2. The bearing surface is offset from the plane in a direction opposite to movement of the movable member. In other words, it is offset from the plane in the direction from which movable member 133 is moving. The extent of offset is such that the center of pressure distribution P on the bearing surface falls on the upstream side of the plane, i.e., on the side from which the movable member is moving. This is clearly illustrated in FIG. 2. This plane passes through the nadir or low point in each laminar portion which is fartherest removed from the bearing surface.

As movable member 113 moves across the bearing surface as shown in FIG. 2, it applies two forces thereto. One force is a load force generally normal to the bearing surface and may be defined as concentrated at a center of pressure P. This force acting about moment arm "a" tends to swing face member 111a about axis 117 to the dotted line position. The other force is a frictional drag across the bearing surface in the direction of movement of movable member 113. This, too, tends to swing face member 111a about axis 117 to the dotted line position.

It will be appreciated that both the load at P acting on the bearing surface and the frictional drag $F_f$ of the movable member across the bearing surface are additive and act in concert to swing the face member in the same direction. Thus, regardless of the relative magnitude of load versus friction drag, the bearing surface is tilted in a direction whereby relative movement of the movable member across the bearing surface causes a wedgeshape film of lubricant (not illustrated on FIG. 2) to be trapped and retained therebetween. The thickness of this film diminishes toward the trailing edge of the bearing surface.

FIG. 3 shows an alternate embodiment of the invention which is very similar to that shown in FIG. 2, and which functions in substantially the same manner. Bearing pad 211 comprises a base member 221b and a face member 221a bonded together on either side of metal-elastomer laminate assembly 218. The face member, while secured to the base member by laminate 218, is adapted to swing on a radius about an axis 217, as previously described. A cap 220, defining a bearing surface, is secured atop the face member and faces movable member 213 in slidable load carrying relationship therewith. Bearing pad 211 may be viewed as a simple modification to pad 111 shown in FIG. 2. It is essentially the disclosure of FIG. 2 with the right and left hand extremities of pad 111 modified to underlie only the bearing surface 120. It will be noted in FIG. 3 that bearing surface 220 is laterally offset from a plane which contains axis 217 and which is generally normal to the direction of movement of movably member 213. The offset is on the upstream side of the plane in a direction opposite to the direction of movement of movable member 213. Again, the offset is such that the center of pressure on the bearing surface also falls on the upstream side of the plane as previously described in relation to the embodiment in FIG. 2. Face member 211a and bearing surface 220 are adapted to tilt to the dotted line position shown in FIG. 3 upon movement thereacross of load applying movable member 213. A wedge-shaped film of lubricant, (not illustrated) is trapped and maintained between the bearing surface and overlying movable member as the latter moves to the right as shown in FIG. 3.

In both embodiments of the invention disclosed in FIGS. 2 and 3, the bearing surfaces, whether formed as a separate portion or integral with face members 111a, or 211a, are at least partially laterally offset to one side of the established plane. The offsets are in the direction opposite to the direction of movement of movable members 113 or 213. By this upstream offset, load on the bearing surface tends to tilt it in the proper direction for scooping a wedge of lubricant. Furthermore, since the axis of swing of face members 111a and 211a is on the opposite side of the line or plane of contact between movable members 113 and 213 respectively, and the bearing surfaces, drag thereacross also tends to tilt the bearing surfaces in the proper direction for scooping lubricant.

While the invention presented in the two embodiments has been represented in relation to a pad for slidable supporting a planar surface, it will be understood that the sliding surface may be in the form of a curve, such as the cylindrical surface of a shaft. The principal of the invention is applicable to either thrust or journal bearings.

It will be understood that the improvement disclosed herein is useful on a bearing designed primarily for a shaft rotating in one direction only. The bearing will be substantially less effective when the shaft is rotating in the other direction. This is a shortcoming of the bearing which must be conceded in obtaining the substantial improvements disclosed herein.

It is obvious that various modifications and changes can be made to the disclosure herein without departing from the spirit of the invention which is defined and limited only by the scope of the claims appended hereto.

What is claimed is:

1. A bearing pad for supporting a relatively movable load applying member through a film of lubricating liquid comprising:

a base member;

a face member supported on the base member and including a bearing surface entirely thereover facing the movable member for slidably carrying the load thereof;

means fixedly connecting the face and base members but permitting swinging movement of the face member relative to the base member on a radius having an axis disposed out of the pad and on the opposite side of the bearing surface;

both said face member and said base member being substantially offset laterally from the nadir of the base member to the upstream side thereof;

whereby the load of the movable member on the bearing surface and frictional drag of the movable member moving across the bearing surface both causes the face member to swing about its axis and tilt the bearing surface so that a leading edge thereof is displaced from the movable member for collecting a wedge-shaped film of lubricating liquid therebetween upon movement of the movable member thereacross.

* * * * *